United States Patent
Ou et al.

(10) Patent No.: US 7,656,856 B2
(45) Date of Patent: Feb. 2, 2010

(54) METHOD AND SYSTEM FOR TRANSMITTING LSP FRAGMENTS

(75) Inventors: Heidi Ou, Saratoga, CA (US); Steven V. Luong, San Jose, CA (US); Rena Whei-Ming Yang, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 11/116,493

(22) Filed: Apr. 28, 2005

(65) Prior Publication Data

US 2006/0245372 A1    Nov. 2, 2006

(51) Int. Cl.
*H04L 12/28* (2006.01)

(52) U.S. Cl. .................. 370/351; 370/216; 370/238; 370/254; 370/256; 709/238; 709/242

(58) Field of Classification Search .............. 370/351, 370/216, 238, 254, 256; 709/238, 242
See application file for complete search history.

(56) References Cited

U.S. PATENT DOCUMENTS

| | | | |
|---|---|---|---|
| 6,614,785 B1 * | 9/2003 | Huai et al. .................. 370/352 |
| 6,820,134 B1 | 11/2004 | Zinin et al. |
| 6,999,459 B1 * | 2/2006 | Callon et al. ................ 370/400 |
| 7,139,838 B1 * | 11/2006 | Squire et al. ................ 709/242 |
| 2002/0051466 A1 * | 5/2002 | Bruckman ................... 370/474 |
| 2002/0131425 A1 * | 9/2002 | Shalom ...................... 370/401 |
| 2003/0233538 A1 * | 12/2003 | Dutertre ..................... 713/151 |
| 2004/0017801 A1 * | 1/2004 | Jacquemin et al. .......... 370/352 |
| 2004/0042395 A1 * | 3/2004 | Lu et al. ..................... 370/225 |
| 2004/0120355 A1 * | 6/2004 | Kwiatkowski .............. 370/506 |
| 2004/0162113 A1 * | 8/2004 | Oomoto et al. ............. 455/560 |
| 2005/0073958 A1 * | 4/2005 | Atlas et al. .................. 370/238 |
| 2007/0274232 A1 * | 11/2007 | Axelsson et al. ............ 370/254 |

* cited by examiner

*Primary Examiner*—Ricky Ngo
*Assistant Examiner*—Luat Phung
(74) *Attorney, Agent, or Firm*—Trellis IP Law Group, PC

(57) ABSTRACT

Methods, systems, and apparatuses for transmitting link state packet (LSP) through a network are provided. The method includes dividing the LSP into LSP fragments having respective fragment numbers, transmitting the LSP fragments repetitively through the network, identifying at least one LSP fragment that is updated while the LSP fragments are being transmitted, and retransmitting the identified LSP fragments. The transmitted updated LSP is used for processing the Shortest Path First algorithm to identify accurately the shortest path that can be used to establish communication in the network.

20 Claims, 5 Drawing Sheets

METHOD AND SYSTEM FOR TRANSMITTING LSP FRAGMENTS

BACKGROUND OF THE INVENTION

1. Field of Invention

The embodiments of the invention relate in general to computer networks. More specifically, the embodiments of the invention relate to methods and systems for transmitting link state packet (LSP) fragments in a computer network.

2. Description of the Background Art

A network device, such as a router, makes routing decisions at the link state in a computer network. The routers make routing decisions based on the information of the network state available with them. Each router identifies the state of the part of the network that is connected to it. This state information specifies who is connected to whom and the cost associated with each connection, such as a value that is configured by an operator to correspond to a speed of a particular connection. This state is then communicated to the other routers connected to the router. The communication between routers is enabled by using routing protocols such as Intermediate System—Intermediate System (ISIS) and Open Shortest Path First (OSPF).

Flooding algorithm is an important consideration while communicating the state of the network to the routers. The availability of the accurate state information at the routers is an important parameter for processing the shortest path first (SPF) function in the flooding algorithm. Timely communication of accurate state of the network is enabled by dividing LSPs into various fragments. Each LSP fragment has certain data fields for communicating the state of the network. Each LSP fragment communicates a part of the state of the network.

Conventional techniques provide an algorithm for transmitting the LSP fragments in the network. In accordance with the technique, the LSP fragments with higher fragment number are lower in priority and hence, the lower fragment numbers are transmitted first. The process of transmitting repeats itself after reaching the highest fragment number. The technique enables continuous transmission of the updated state of the network. However, in case the state of the network gets updated while a fragment between lowest and the highest fragment numbers is being flooded, the SPF function is processed with the received state of the network and not with the latest updated state of the network.

DETAILED DESCRIPTION OF EMBODIMENTS OF THE INVENTION

Figure 1:
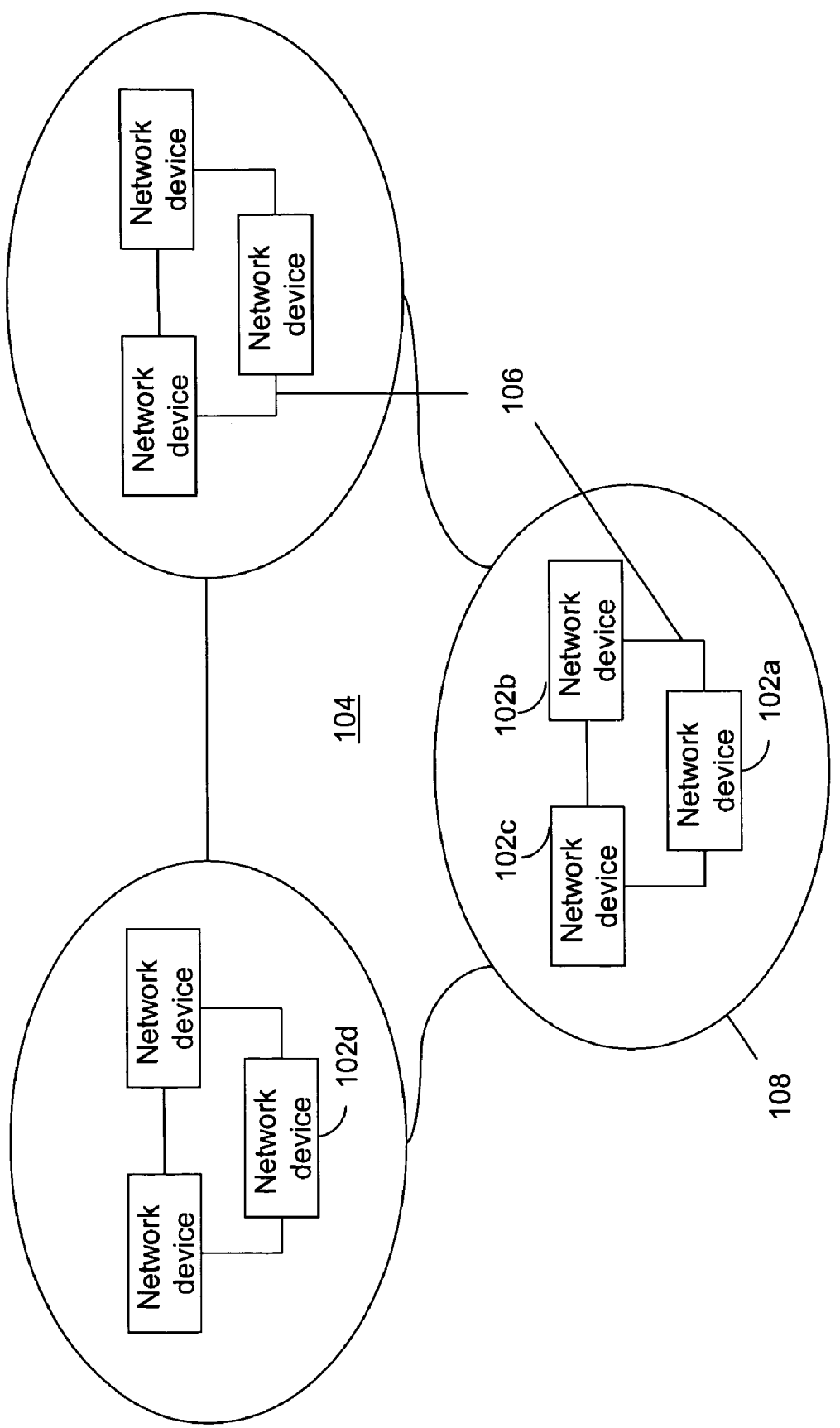
FIG. 1 illustrates an exemplary environment in which an embodiment of the invention can function.

Various embodiments of the invention provide a method, a system, an apparatus and a machine-readable medium for transmitting a Link State Packet (LSP) in a network. The LSP is divided into various LSP fragments each having a fragment number associated to it. Each of the LSP fragment includes certain data fields that are transmitted through the network. In accordance with an embodiment of the invention, a method for transmitting these LSP fragments is provided. The LSP fragments contain the information of the network state as defined by the current states of the network links. The information contained in the transmitted LSP fragments is used to process the Shortest Path First (SPF) function. The method, as provided in various embodiments of the invention, ensures that up-to-date information is transmitted using the LSP fragments, thereby ensuring greater accuracy while processing the SPF function.

Each LSP fragment has an associated fragment number (starting from fragment number zero) and is being used to send at least one part of the information. In accordance with an embodiment of the invention, important information such as attached bit, overload bit, Multi-Topology ID (MT ID) Type Length Values (TLVs), and domain-address TLVs are carried by LSP fragment with the fragment number zero. In accordance with an embodiment of the invention, flooding of the LSP fragments starts with the LSP fragment with the lowest fragment number to the highest fragment number, and then the process repeats itself.

Each of the LSP fragments has a Send Routing Message (SRM) bits. In accordance with an embodiment of the invention, if the SRM bits are set at a LSP fragment, the LSP fragment is flooding-active, else the LSP fragment is flooding-inactive. Before flooding any LSP fragment, the status of the SRM bits is verified, and the flooding-active LSP fragments are flooded. Various deciding parameters are identified before setting the SRM bits in a LSP fragment. Some of the parameters for deciding the setting of the SRM bits are the change of interface metric, and the change of IP address of the interface, and the change of the interface state.

Examples of the protocols used to realize the communication between network devices for transferring LSP fragments or Link-State Advertisements (LSAs) include Intermediate System-to-Intermediate System (ISIS) and Open Shortest Path First (OSPF). These protocols are generally used by the routers belonging to different areas to distribute routing information among the connected routers.

The ISIS and OSPF protocols are described in detail in Request for Comments (RFC) 1195 (Use of OSI IS-IS for Routing in TCP/IP and Dual Environments) by R. Callon (1990), ISO/IEC 10589:1992 Information technology—Telecommunications and information exchange between systems—Intermediate system to Intermediate system intra-area routing information exchange protocol for use in conjunction with the protocol for providing the connectionless-mode Network Service (ISO 8473), RFC 2328 (OSPF Version 2) by J. Moy (1998), and Interconnections, Second Edition by R. Perlman, published by Addison Wesley Publishing Co., (2000), each of which is hereby incorporated by reference as if repeated verbatim immediately hereinafter.

FIG. 1 illustrates an exemplary environment in which an embodiment of the invention can function. In accordance with an embodiment of the invention, network devices 102 are connected in a network 104. In various embodiments of the invention, network devices 102 can be routers, switches and bridges. Each of network devices 102 is further connected to a network of computing devices such as personnel computers, general-purpose computers and the like. Network 104 includes a plurality of areas 108 wherein each area is separated from the other area. The separation is realized depending on the factors such as geographical location, process separation, and area separation. Each area can include a Local Area Network (LAN), virtual LAN (VLAN) and the like. Each area includes a network of computing devices that are directly connected to a network device such as router. For example, area 108 includes network devices 102a, 102b and 102c.

Connection of a network device such as 102a with computing devices/network of computing devices within the area is referred to as intra-level connection. Connection between network devices such as 102a and 102b are referred to as inter-level connections. In various embodiments of the invention, connections 106 between network devices 102 are based on link state communication channels.

Examples of the protocols used to realize communication between a pair of network devices for transmitting LSP fragments containing the state information is IS-IS. The IS-IS protocol is generally used by the network devices belonging to different areas to distribute routing information among them. Examples of network devices 102 include routers. A router is divided into two categories depending on their functionality. These are inter-level routers and intra-level routers. Inter-level routers are used for inter-area communication and intra-level routers are used for intra-area communications. Communication among the routers is typically effected by exchanging LSP fragments in accordance with the predefined protocols. Examples of such protocols include Transmission Control Protocol/Internet Protocol (TCP/IP).

Figure 2:
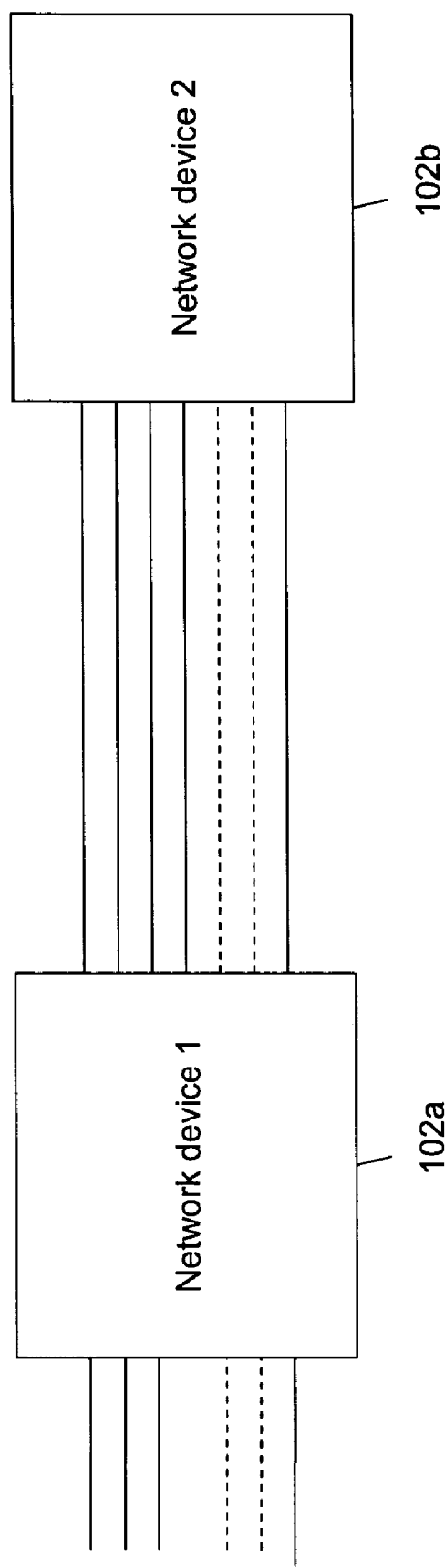
FIG. 2 illustrates an exemplary connection between a plurality of network devices, in accordance with an embodiment of the invention.

FIG. 2 illustrates an exemplary connection between a pair of network devices, in accordance with an embodiment of the invention. In accordance with an embodiment of the invention, network device 102a gets the input regarding the state of the network from all connected network devices and passes on this information, along with the information regarding its own state, to network device 102b. The network state information is comprised in a LSP. The LSP is divided into a plurality of fragments referred to as LSP fragments. Each of the LSP fragment carries an associated set of information regarding the overall state of the network. This information is sent through LSP fragments. In an embodiment of the invention, LSP fragments include information captured from the LSPs received from a network device and destined for another network device, for example from network device 102a to 102b. In accordance with an embodiment of the invention, LSP fragment with fragment number zero is used to send the most important information regarding the state of the network such as attached bit, overload bit, MT ID TLVs, and area-address TLVs.

Figure 3:
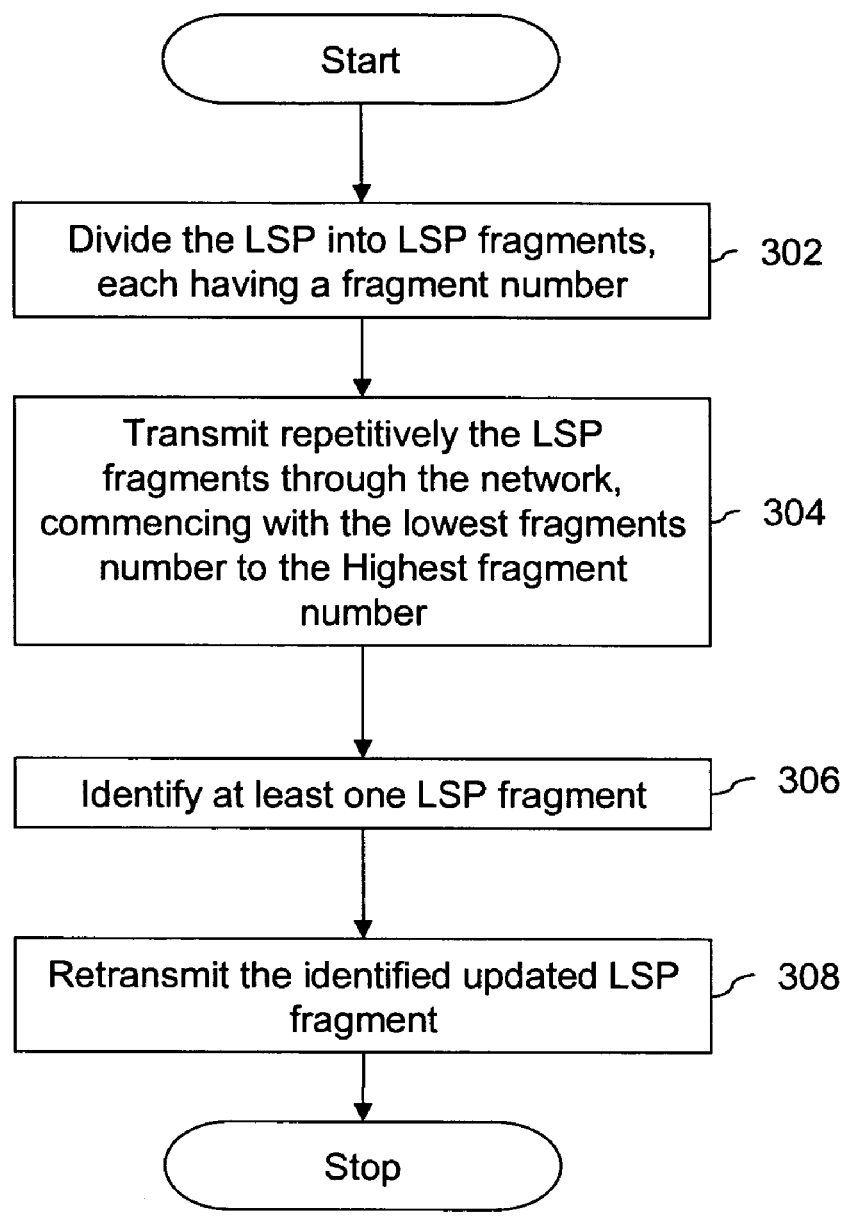
FIG. 3 is a flowchart providing an overview of a method for transmitting LSP through a network, in accordance with an embodiment of the invention.

FIG. 3 illustrates a flowchart providing an overview of a method for transmitting LSPs through a network, in accordance with an embodiment of the invention. At step 302, a LSP is divided into a plurality of LSP fragments. Each of the LSP fragment has a fragment number and includes information regarding a part of the overall state of the network. At step 304, the network device transmits the LSP fragments to the connected network devices. In accordance with an embodiment of the invention, the network device transmits the LSP fragments, which have their SRM bits set. At step 306, the network device identifies at least one updated LSP fragment that has been received by the network device. In accordance with an embodiment of the invention, all the identified LSP fragments have a common system ID. In case the identified LSP fragments contain updated information regarding the state of the network, the network device rebuilds its database. At step 308, the updated LSP fragments are retransmitted starting with the lowest fragment number. In accordance with an embodiment of the invention, while performing step 308, fragment numbers of all the updated LSP fragments are compared and the LSP fragment with the lowest fragment number is selected to perform a check for the SRM bits. The check is performed only for the LSP fragments with the same system ID. In accordance with an embodiment of the invention, the transmitted LSP fragments are used for processing the SPF function, to accurately determine the shortest path for communication.

The above-described method is hereinafter explained by means of an example. In accordance with step 302, the LSP associated with a network device is divided into eleven LSP fragments, starting with fragment zero to fragment ten. Suppose that the fragment zero, fragment three and fragment ten have their respective SRM bits set. In accordance with an embodiment, the above-described method is performed repetitively, and sequentially starting from the LSP fragment with lowest fragment number and moving to the LSP fragments with higher fragment number.

In accordance with step 304, state of the network is communicated starting with the transmission of the fragment zero. After fragment zero is flooded, fragment one is checked. As SRM bits are not set for fragment one, it is not flooded. Similarly, fragment two is not flooded. However, fragment three is flooded as the SRM bits for fragment three are set. While the flooding process is in progress, consider a case wherein the fragments zero and two are rebuilt or received with the updated information about the state of the network.

As soon as the rebuilding/receipt of the LSP fragments containing updated information is received in accordance with step 306, the network device identifies the receipt of an updated LSP fragment zero and fragment two. Subsequently, in accordance with step 308, fragment zero is selected, since it is the lowest fragment with the updated LSP. Thereafter, in accordance with step 308, starting with the transmission of fragment zero, fragment two and fragment ten are retransmitted as they have the SRM bits set. In this way, the connected network devices get updated with the most current information about the state of the network. The connected network devices can then process the SPF algorithm using the updated LSP fragments to determine the shortest path for communication more accurately.

Figure 4:
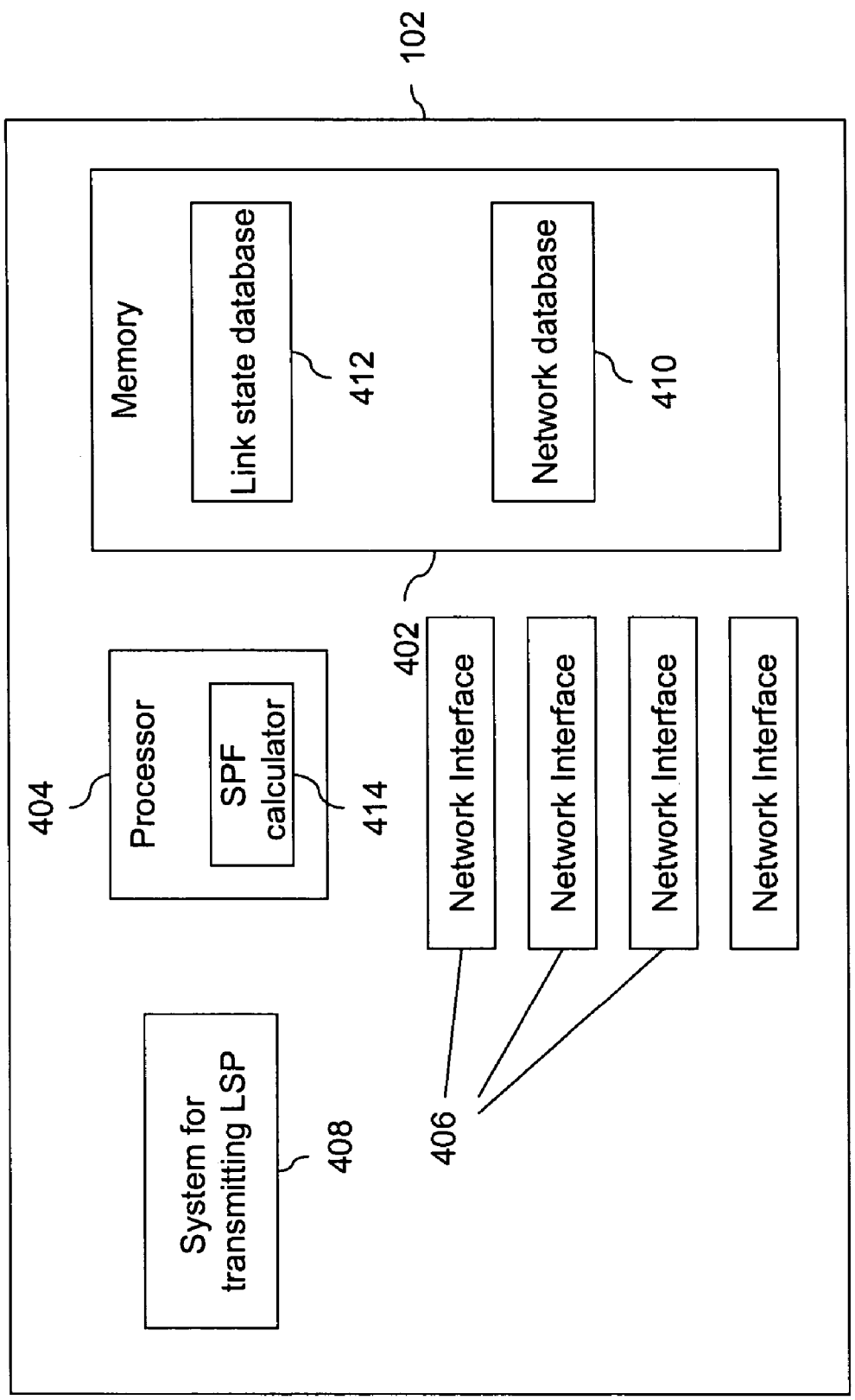
FIG. 4 illustrates a block diagram of an exemplary network device, in accordance with an embodiment of the invention.

FIG. 4 illustrates a block diagram of network device 102, in accordance with an embodiment of the invention. Network device 102 identifies the shortest path for the incoming LSPs by using the most recent network state information. In accordance with an embodiment of the invention, network device 102 includes a memory 402, a processor 404, a network interface 406, and a system for transmitting LSP fragments 408.

Memory 402 stores the state of the network that is being connected to network device 102. In accordance with an embodiment of the invention, memory 402 includes two separate databases, a network database 410, and a link state database 412. Network database 410 stores the present state of the network as estimated by network device 102. Link state database 412 stores the state of the network communicated by the other network devices.

Processor 404 processes the information contained in the incoming LSP fragments and determines the shortest path using a SPF calculator 414. In various embodiments of the inventor, SPF calculator 414 computes the shortest path based on SPF algorithm. Network interfaces 406 are used for communicating with the other network devices. In an embodiment of the invention, network interfaces 406 can include Ethernet cables. System for transmitting LSP fragments 408 is used for transmitting the LSP fragments through the network to enable accurate processing of the SPF functions. System 408 is discussed in detail in conjunction with FIG. 6.

Figure 5:
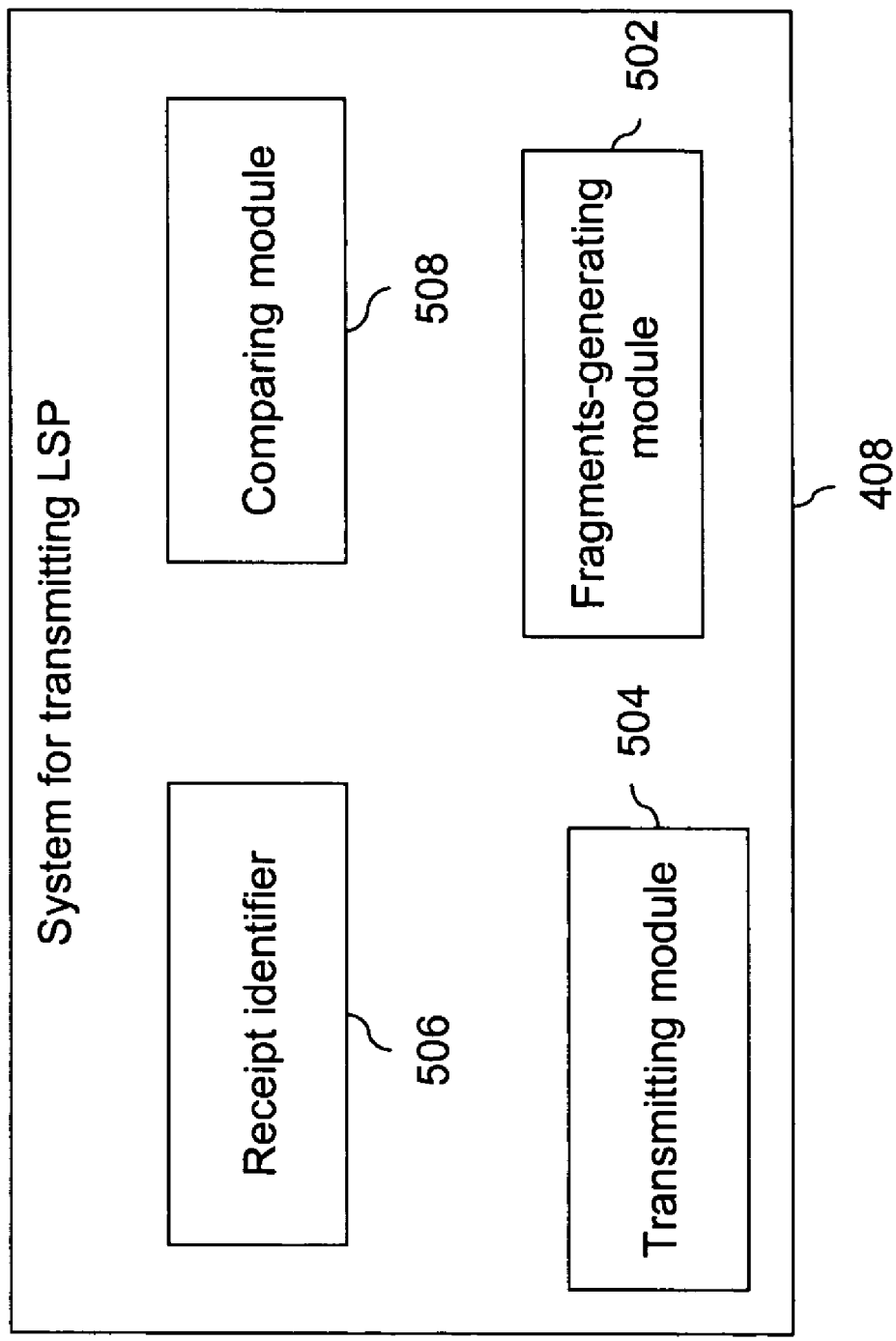
FIG. 5 illustrates a block diagram of a system for updating LSP fragments, in accordance with an embodiment of the invention.

FIG. 5 illustrates a block diagram of system for transmitting LSP fragments 408, in accordance with an embodiment of the invention. In accordance with an embodiment of the invention, system 408 is located in network device 102. In accordance with an embodiment of the invention, system 408 includes a fragments-generating module 502, a transmitting module 504, a receipt identifier 506, and a comparison module 508. Fragments-generating module 502 divides a LSP into a plurality of LSP fragments, each having an associated fragment number. Transmitting module 504 enables flooding of the selected LSP fragment first and then sequentially allows flooding of the LSP fragments with the SRM bits set. In accordance with an embodiment of the invention, the sequence goes from lower fragment number to higher fragment number. Receipt identifier 506 identifies the updated LSP fragments that have been received/re-built. Comparison module 508 compares the fragment number of all the identified LSP fragments to select the LSP fragment with the lowest fragment number. In accordance with an embodiment of the invention, system 408 additionally comprises a means for setting SRM bits.

In various embodiments of the invention, the system elements of system 408 can be implemented as software modules, hardware modules, firmware and their combination thereof.

To summarize, the various embodiments of the invention dynamically adjust the next-to-be-checked LSP to be the one, which has the smallest fragment number within the same system ID. Each time an LSP fragment is rebuilt or received, a quick check is performed to compare the LSP's system ID with the current next-to-be-checked fragment's system ID. If they have the same system ID, the one with smaller fragment number is used to perform the checking and transmitting.

Various embodiments of the invention have the advantage that the network device is updated with the up-to-date network state. This advantage is achieved due to the active checking for the receipt of the updated LSP fragments that can change the state communicated to the connected network devices. Additionally, the incoming LSP fragments can change the SRM setting on the LSP fragments, which can change the order of flooding the LSP fragments.

Further, various embodiments of the invention provide a method for redefining flooding algorithm to improve the processing of the SPF function. The efficiency of the SPF function depends on the communication of the most recent state of the network. The embodiments of the invention allow communication of the most recent state of the network to be achieved. This involves continuously flooding the updated LSP fragments starting with the lowest fragment number every time a LSP fragment is updated.

Various embodiments of the invention also have the advantage that no modification to the IS-IS protocols is required. Further, overhead in the flood checking is minimal.

Although the invention has been discussed with respect to specific embodiments thereof, these embodiments are merely illustrative, and not restrictive, of the invention. For example, a 'method for updating Link State Packet (LSP) fragments in a computer network' can include any type of analysis, manual or automatic.

Although specific protocols have been used to describe embodiments, other embodiments can use other transmission protocols or standards. Use of the terms 'peer', 'client', and 'server' can include any type of device, operation, or other process. The invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Also in the description herein for embodiments of the invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention described and illustrated herein are possible in light of the teachings herein and are to be considered as part of the spirit and scope of the invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for transmitting a link state packet (LSP) through a network, the method comprising
receiving a plurality of LSP fragments for an LSP, wherein the LSP is divided into the plurality of LSP fragments, the plurality of LSP fragments identified with fragment numbers and a common system ID, wherein an importance is attributed to an LSP fragment based on the fragment number;
determining an LSP fragment in the plurality of LSP fragments considered to be most important in the plurality of LSP fragments;
transmitting the plurality of LSP fragments in sequential order from a first number identifier to a last number identifier based on which LSP fragments are considered to be most important to LSP fragments that are considered to be least important;
receiving an update of at least one LSP fragment;
identifying the at least one LSP fragment that is updated while the plurality of LSP fragments are being transmitted, the at least one LSP fragment having a number identifier in the sequential order that has been transmitted already;
determining if the at least one LSP fragment is associated with the system ID that identified the plurality of LSP fragments; and
if the at least one LSP fragments is associated with the system ID, retransmitting the identified at least one LSP fragment before other LSP fragments in the plurality of fragments that have not been transmitted if the identified LSP fragment is considered to be more important than the other LSP fragments not yet transmitted such that the re-transmission of the at least one LSP fragment is performed before transmitting an LSP fragment associated with the last number identifier in the sequential order and is a transmission of an LSP fragment previously transmitted with a same number identifier and system ID as the identifier at least one LSP fragment.

2. The method of claim 1, wherein the plurality of LSP fragments being transmitted have their send routing message (SRM) bits set, the setting of the SRM bits permitting the transmission of the plurality of LSP fragments.

3. The method of claim 1, wherein the transmitting the plurality of LSP fragments occurs sequentially from a lower fragment number to a higher fragment number.

4. The method of claim 1, wherein the retransmitting the identified LSP fragments comprises
comparing the fragment numbers of the identified LSP fragment and LSP fragments not yet transmitted; and
transmitting the identified LSP fragment and LSP fragments not yet transmitted in a sequence commencing with a LSP fragment with a lowest fragment number from amongst the identified LSP fragment and LSP fragments not yet transmitted.

5. The method of claim 1, wherein the identified LSP fragment and LSP fragments not yet transmitted have the common system ID.

6. The method of claim 1, further comprising:
determining a first LSP fragment and a third LSP fragment for transmission, the first LSP fragment associated with a first fragment number and the third LSP fragment associated with a third fragment number;
transmitting the first LSP fragment with the first fragment number;

receiving an update for a second LSP fragment with a second fragment number that is considered more important than the third fragment number; and transmitting the second LSP fragment before transmitting the third LSP fragment.

7. The method of claim 6, further comprising:

receiving an update for the first LSP fragment with first fragment number, the first fragment number being considered more important than the third fragment number; and retransmitting the first LSP fragment before transmitting third LSP fragment.

8. The method of claim 7, wherein the first LSP fragment includes the common system ID as the third LSP fragment.

9. The method of claim 6, wherein the second fragment number is lower than the third fragment number.

10. The method of claim 1, further comprising:

comparing fragment numbers for LSP fragments that are determined to be ready to send;

selecting an LSP fragment that is considered to be most important in the LSP fragments ready to send; and transmitting the LSP fragment considered to be most important.

11. A system for transmitting a link state packet (LSP) through a network, the system comprising one or more computer processors; and logic encoded in one or more tangible media for execution by the one or more computer processors and when executed operable to:

receive a plurality of LSP fragments for an LSP, wherein the LSP is divided into the plurality of LSP fragments, the plurality of LSP fragments identified with fragment numbers and a common system ID, wherein an importance is attributed to an LSP fragment based on the fragment number;

determine an LSP fragment in the plurality of LSP fragments considered to be most important in the plurality of LSP fragments;

transmit the plurality of LSP fragments in sequential order from a first number identifier to a last number identifier based on which LSP fragments are considered to be most important to LSP fragments that are considered to be least important;

receive an update of at least one LSP fragment;

identify the at least one LSP fragment that is updated while the plurality of LSP fragments are being transmitted, the at least one LSP fragment having a number identifier in the sequential order that has been transmitted already;

determine if the at least one LSP fragment is associated with the system ID that identified the plurality of LSP fragments; and retransmit, if the at least one LSP fragment is associated with the system ID, the identified at least one LSP fragment before other LSP fragments in the plurality of fragments that have not been transmitted if the identified LSP fragment is considered to be more important than the other LSP fragments not yet transmitted such that the re-transmission of the at least one LSP fragment is performed before transmitting an LSP fragment associated with the last number identifier in the sequential orders and is a transmission of an LSP fragment previously transmitted with a same number identifier and system ID as the identifier at least one LSP fragment.

12. The system of claim 11 further comprising a comparison module for comparing the fragment numbers of the identified LSP fragments.

13. The system of claim 11, the logic operable to transmit the LSP fragments sequentially from the lower fragment number to the higher fragment number.

14. The system of claim 11, wherein the logic operable to transmit the LSP fragments having their send routing message (SRM) bits set.

15. The system of claim 11, wherein the logic is further operable to:

determine a first LSP fragment and a third LSP fragment for transmission, the first LSP fragment associated with a first fragment number and the third LSP fragment associated with a third fragment number;

transmit the first LSP fragment with a first fragment number;

receive an update for a second LSP fragment with a second fragment number that is considered more important than the third fragment number; and transmit the second LSP fragment before transmitting third LSP fragment.

16. The system of claim 15, further comprising:

receiving an update for the first LSP fragment with first fragment number, the first fragment number being considered more important than the second fragment number; and retransmitting the first LSP fragment before transmitting second LSP fragment.

17. The system of claim 16, wherein the second fragment number is lower than the third fragment number.

18. The system of claim 16, wherein the first LSP fragment includes the common system ID as the third LSP fragment.

19. The system of claim 11, wherein the logic is further operable to:

compare fragment numbers for LSP fragments that are determined to be ready to send;

select an LSP fragment that is considered to be most important in the LSP fragments ready to send; and transmit the LSP fragment considered to be most important.

20. A system for transmitting link state packet (LSP) through a network, the system comprising means for receiving a plurality of LSP fragments for an LSP, wherein the LSP is divided into the plurality of LSP fragments, the plurality of LSP fragments identified with fragment numbers and a common system ID, wherein an importance is attributed to an LSP fragment based on the fragment number;

means for determining an LSP fragment in the plurality of LSP fragments considered to be most important in the plurality of LSP fragments;

means for transmitting the plurality of LSP fragments in sequential order from a first number identifier to a last number identifier based on which LSP fragments are considered to be most important to LSP fragments that are considered to be least important;

means for receiving an update of at least one LSP fragment;

means for identifying the at least one LSP fragment that is updated while the plurality of LSP fragments are being transmitted, the at least one LSP fragment having a number identifier in the sequential order that has been transmitted already;

means for determining if the at least one LSP fragment is associated with the system ID that identified the plurality of LSP fragments; and means for retransmitting, if the at least one LSP fragment is associated with the system ID, the identified at least one LSP fragment before other LSP fragments in the plurality of fragments that have not been transmitted if the identified LSP fragment is considered to be more important than the other LSP fragments not yet transmitted such that the re-transmission of the at least one LSP fragment is performed before transmitting an LSP fragment associated with the last number identifier in the sequential order and is a transmission of an LSP fragment previously transmitted with a same number identifier and system ID as the identifier at least one LSP fragment.

* * * * *

UNITED STATES PATENT AND TRADEMARK OFFICE
CERTIFICATE OF CORRECTION

| | |
|---|---|
| PATENT NO. | : 7,656,856 B2 |
| APPLICATION NO. | : 11/116493 |
| DATED | : February 2, 2010 |
| INVENTOR(S) | : Ou et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 900 days.

Signed and Sealed this

Twenty-eighth Day of December, 2010

David J. Kappos
*Director of the United States Patent and Trademark Office*